April 25, 1933.   W. E. URSCHEL   1,905,194
HARVESTING MACHINE
Filed Jan. 12, 1931   4 Sheets-Sheet 1

INVENTOR.
William E. Urschel
BY
ATTORNEY.

April 25, 1933.  W. E. URSCHEL  1,905,194
HARVESTING MACHINE
Filed Jan. 12, 1931  4 Sheets-Sheet 4

INVENTOR.
William E. Urschel
BY
ATTORNEY.

Patented Apr. 25, 1933

1,905,194

UNITED STATES PATENT OFFICE

WILLIAM E. URSCHEL, OF VALPARAISO, INDIANA

HARVESTING MACHINE

Application filed January 12, 1931. Serial No. 508,125.

The present invention relates to a harvesting machine, and it has particularly to do with a device particularly suited to harvest sugar beets, although its utility is in no manner limited to that crop.

The invention contemplates a power drive. It is adapted, first, to gradually elevate a soil-embodied crop to effect the removal of such crop from the soil, second, to convey the crop into a position where it is uniformly disposed in respect to selected severing members, and thereafter, to sever the appendages and a portion of the top section from the crop by the use of the selected severing members.

The harvester is so constructed and arranged that the conveyors therein are positioned to elevate the crop to a height from which such crop may be discharged into a wagon traveling alongside of the apparatus, or into a suitable receptacle which may be arranged upon the harvester itself.

Harvesters of heretofore proposed construction have not proven entirely efficient, and this is particularly true in respect to harvesters for sugar beets. Sometimes sugar beets are tenaciously held in the soil. An abrupt pull upon the tops of such beets has been the heretofore conventional manner of dislodging such a crop from the soil. Such handling, however, has resulted in a number of the beets being left in the ground because of the separation of the appendages from the root crop without dislodging the root crop from the ground. In fact, the proportion of the crop not removed by mechanical harvesters heretofore suggested has made such heretofore proposed devices unsuccessful commercially.

Additionally, sugar beets are quite irregular in growth. Some of the beets grow entirely beneath the surface of the soil, while other beets project above the ground in different proportions. There is no accurate gauge to determine the proportion of a beet body which will be submerged beneath the soil. Some beets appear to be wholly out of the ground except for a few straggling thready roots.

In sugar beets, unlike most other root crops, it is desirable to remove a top part of the body of the crop. Such top part, which is relatively small in proportion to the body of the beet, is low in sugar content, and is so tough that it is injurious to the various machines which are used in the various processes of recovering the beet juice for the production of sugar.

The present invention provides for the efficient gathering of beets, whether entirely submerged in the soil, or merely resting on the top thereof, and for the removal of the leaf appendages with a selected portion of the top of the beet.

Knives have heretofore been employed upon a few types of harvesters, and, when so employed, some of these have been mounted beneath the pulling members of the harvester. This has been one of the conventional manners in which such knives have been mounted, but none of these cutting devices has proved wholly satisfactory because the action of such knives has been more or less irregular. Some crops were hardly touched by the knives, while others have been completely cut away. All of these difficulties of irregularity are rectified in the present instrumentality which produces an extraordinarily uniform result in respect to removing limited portions of the beets along with the leaf appendages of the crop.

It is desirable to provide adjustments for harvesting instrumentalities to enable a wide range of effective variances in the positions of the several elements connected therewith in order that the harvester may be made effective with respect to normal crops and also with respect to abnormal growths or conditions. Such adjustments are necessary to harvest varying crops without injury. Compensating adjustments are highly desirable when the direction and magnitude of the growth of a crop and the ease of its removal from the ground are highly variable factors. It is believed that the present apparatus fully compensates for any factor hereinabove mentioned, or any other factor which may be met in the harvesting of sugar beets and similar root crops.

Included in the objects of the invention, among others, are the following:

An improved means for imparting a gradual lift and a concurrent pull upon a soil embodied crop to effect its removal from such soil.

An improved means for conjointly lifting and pulling a soil embodied crop from the soil.

An improved means for conveying a crop along a predetermined path within the apparatus for treatment by instrumentalities for severing parts of the harvested crop.

A new and improved means for determining the point at which a harvested article shall be acted upon by severing instrumentalities or tools.

Novel means for harvesting a crop, like sugar beets, and conveying such crop past cutters whereby a portion of the beets and all of the appendages of such beets are removed therefrom.

Novel means for regulating the position of a beet, or other object, as it approaches cutting members or other instrumentalities.

Means for separating the appendages from the root portion of a crop.

The combination of elevating means with means for determining the position of which a crop will occupy when engaging severing means.

Other objects and advantages will appear from the hereinafter given description of the single embodiment of the present invention illustrated in the accompanying drawings, hereby made a part of this specification, and in which:—

Like reference characters are used to designate similar parts in the drawings and in the description of the invention hereinafter given.

For convenience of description and full understanding, the machine may be divided roughly into its several units, as, for example, its frame, its transmission mechanism, the pullers, and the cutting mechanism. These are described separately.

*The frame construction*

Figures 1, 15:
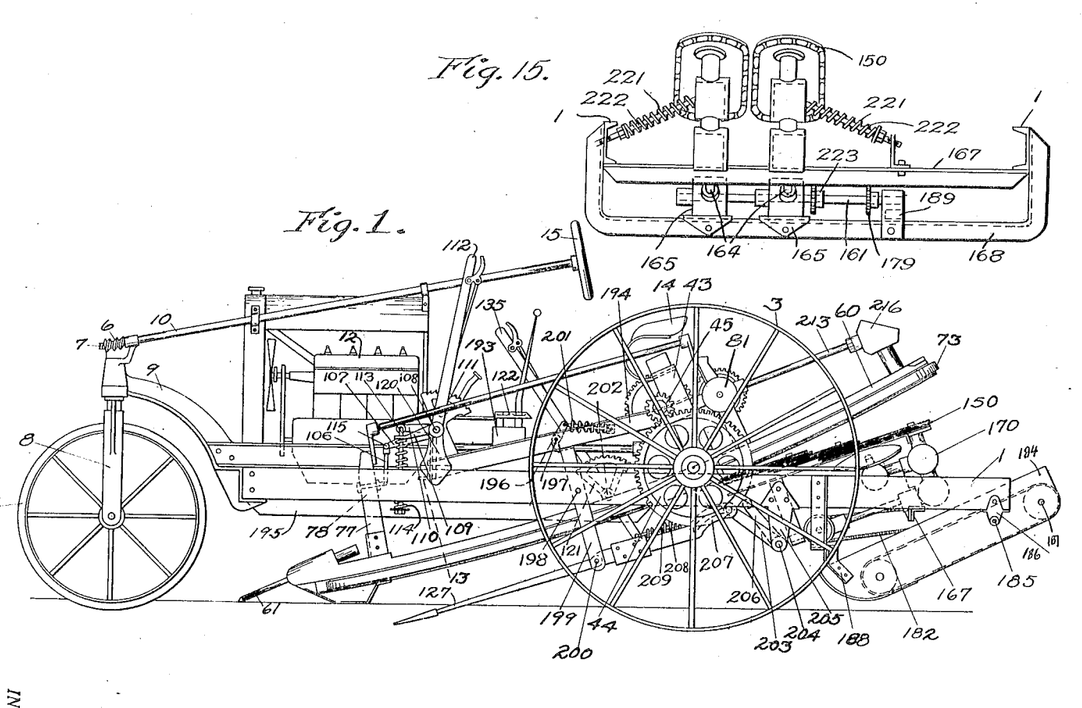
Figure 1 is a side elevation of a complete machine possessing the features of the present invention.
Figure 15 is a detailed sectional view of the guide or gauging chains support showing the drive therefor and the frame for their support.
Figures 2, 3, 4:
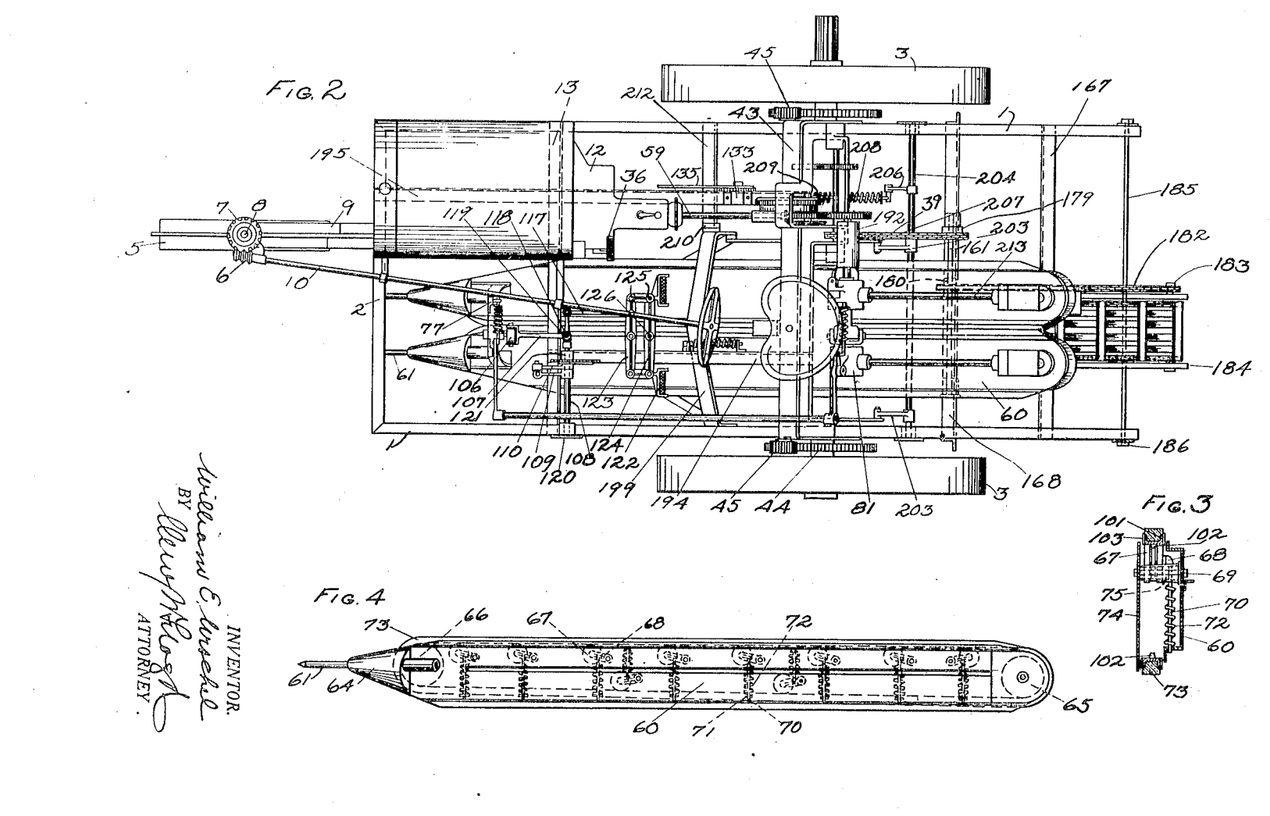
Figure 2 is a plan view of the harvesting device shown in Figure 1.
Figure 3 is a transverse section of a puller frame, two of which are used in the machine illustrated in Figures 1 and 2.
Figure 4 is a plan view of one of such puller frames.
Figure 7:
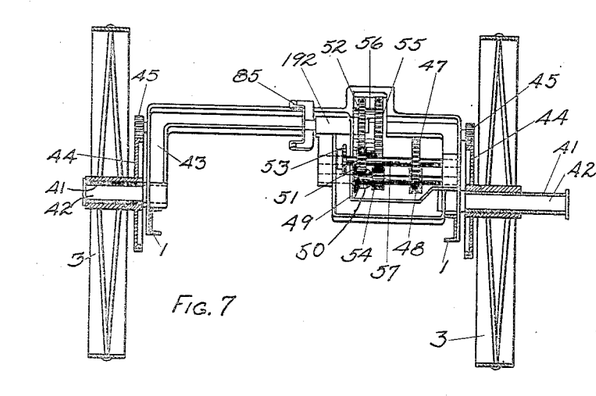
Figure 7 is a transverse section, partly in elevation, illustrating the transmission frame and drive for the machine.

For the details of the frame structure, reference should be had primarily to Figures 1 and 2, which figures may conveniently be read conjointly. A main frame for the apparatus may comprise two or more longitudinally disposed parallel main frame members 1, secured together by a plurality of transverse frame members, such as the members 2. In the present instance two members 2 are employed in conjunction with other transverse members. Assisting in maintaining the frame members 1 in parallelism is transmission frame 43 which is best illustrated in Figure 7.

At each side of the main frame are bull wheels 3, which bull wheels support the frame above the ground. These wheels are rotatably mounted upon stub axles 42, the latter being secured in the transmission frame 43. Ring gears 44 are securely fastened to each of the bull wheels 3 by the employment of bushings 41.

In juxtaposition to the front transverse member 2 and intermediate said member 2 and the transmission frame 43 is another transverse frame member 13. Between the forward transverse member 2 and said transverse member 13 and at the right hand side of the machine (Figure 1) is any conventional form of suitable internal combustion engine designated 12. This engine constitutes the prime mover for driving the harvester and its parts.

In a supporting bracket 9 at the top and front of the machine is a fork 8, and within the fork 8 is disposed a front or guide wheel 5. Said wheel is freely rotatable in the fork 8, and said fork 8 is mounted for free rotation in the bracket 9.

Upon the fork 8 is a gear 7. For the purpose of rotating such gear, which rotates the fork 8, there is upon a steering rod 10 a worm 6 meshing with said gear. Rotation of the steering rod 10, which is mounted in suitable brackets disposed upon the front transverse member 2 and the transverse member 13, is a steering wheel 15.

In juxtaposition to the steering wheel 15, and mounted upon the transmission frame 43, is a driver's seat 14 which may be of any suitable configuration and style. In operation, an operator seated in the seat 14 is enabled to control the speed of the engine 12 and the bull wheels 3, and he also controls the course of the harvester by adjustment of the steering fork 8 through the steering wheel 15, rod 10, and gears 6 and 7. Thus the operator is enabled to direct the machine to travel down a row of sugar beets, or other crop, and, when the end of such a row is attained, to steer the machine into operable relation to some other row of crop, or elsewhere as needs demand.

The transmission

Figure 8:
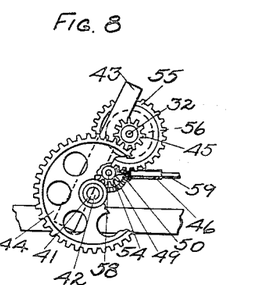
Figure 8 is a detail side elevation of the bull wheel driving mechanism.

Extending rearwardly from the engine 12 and to a bearing bracket 46, which is mounted on said transmission frame 43 (see Figure 8), is a clutch shaft 59. A pinion 50 is secured to said shaft 59. Said pinion 50 drives a bevel gear 49 which is keyed to a transverse shaft 58, which latter shaft rides in suitable bearings provided therefor in the transmission frame 43.

A pinion 54 is secured upon shaft 58 and drives a ring gear 55 which is mounted upon a conventional form of differential, designated generally 56. A shaft 32 journalled in the transmission frame 43 extends from the differential 56, and pinions 45, secured to such shaft, drive ring gears 44 which, as has been previously pointed out, are securely fastened to bushings 41. The bull wheels 3 are secured to said bushings 41 and are rotatably mounted on axles 42, as previously recited. A clutch mechanism upon the engine 12 is controlled from the operator's seat 14 by a conventional clutch controlling pedal 36. It is in this manner that the engine 12 is coupled to the drive wheels 3 to give tractive effect to the harvester.

Figure 9:
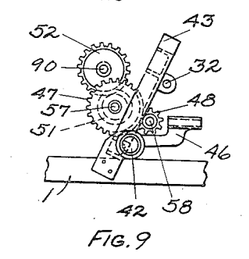
Figure 9 is a detail elevation of the puller drive.

Another shaft 57 is journalled in the transmission frame 43, and is arranged transversely in respect to main frame member 1. It is driven by a gear 48 fastened to said shaft 58 which meshes in a gear 47 secured to said shaft 57. Said shaft 57 also carries a gear 51 which meshes with a gear 52, the latter being attached to a puller shaft 90. In reading Figure 7, reference should also be had to Figures 8 and 9. Thus the crop pullers are actuated to operate as is later described.

The puller mechanism

Figure 6:
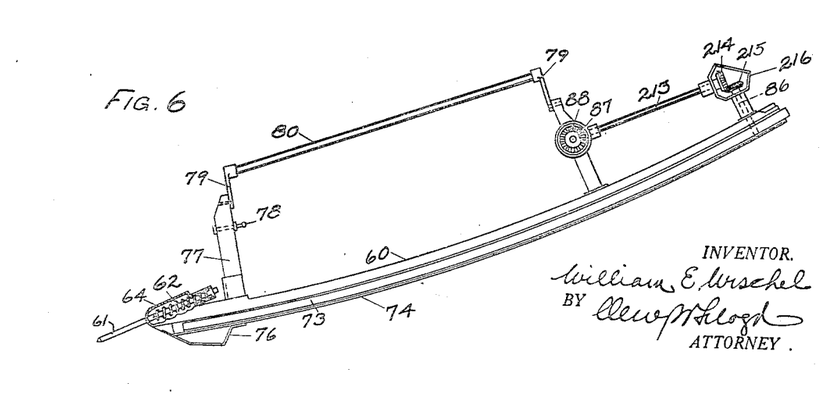
Figure 6 is a side elevation of a crop puller and pertinent parts.

Mounted upon the left side of the machine (Figure 1) are paired and oppositely disposed puller frames 60 plainly shown in Figure 2. At their front end, the puller frames 60 are held in spaced relation by an arch bracket 77 (Figure 6).

A second arch bracket 81 is at the rear end of the puller frames 60 (Figure 2). In said bracket 81 are bearings for two longitudinal shafts 213, and the driving members therefor (see Figures 5 and 6).

The puller frames 60 are supported upon the transmission bracket 43 by a bracket 192. A clevis 85 (Figure 5) is arranged to turn freely in the bracket 192 whereby to permit the forward end of the puller frames 60 to be raised or lowered.

Said clevis 85 provides a bearing for the shaft 90, heretofore mentioned, and which is secured to a gear 52. The shafts 213 are driven from shaft 90 by two bevel gears 87 and 88 (see Figure 5).

Within the puller frames 60 are end sprockets 65 and 66, the periphery thereof providing guiding means for a puller chain. Sprocket 65 is secured to a shaft 86 (see Figure 6) which is driven by shaft 213, the intermediate gears being designated by the numerals 214 and 215. In order that the shafts 213 and 86 shall have suitable bearings, a bracket 216 is provided for each of the puller frames 60 (Figure 6).

Clevis 85, at the rear, is hinged to the rear arch bracket 81 by pins 84. These permit the front end of the puller frames 60 to be guided transversely in keeping with irregularities in the row of a crop, thus compensating for the physical inability of an operator to drive the machine, as a whole, with a sufficient degree of accuracy to provide for exact registration at all times with a crop.

In order that the puller frames 60 may be moved transversely, a flexible joint 91 (see Figure 5) is mounted upon the shaft 90 at the point where the arch bracket 81 and the clevis 85 are hinged.

About the sprockets 65, and 66, the former being the drive sprocket, and the other being a guide roller pulley, a stalk puller chain moves. Said chain comprises a rubber or elastic part and includes chain links which rotate upon sprockets 65 and 66 and upon which the rubber or elastic parts are seated.

A full and complete description and illustration of the driving sprockets 65 and 66, and the chain and belt thereabout, is to be found in the co-pending application of William E. Urschel, the inventor, here, Serial Number 342,032, filed February 23, 1929, entitled "Bean harvester", and in other applications for Letters Patent in the name of the present applicant.

In view of this previous complete disclosure of the character of stalk puller chain there shown and here employed, the present drawings do not illustrate in such great detail the structural features of the puller chain, which is designated generally 73. The description of the chain is somewhat limited also, although it is believed to be, as presented, entirely satisfactory for the purposes of the present application.

The chain 73 comprises a channeled member having flanges with eyes therein, each link being designated 101, and having upon the back thereof a projecting lug 102. Intermediate each pair of main links 101 are a pair of side plates 103. Each of the side plates 103 carries two apertures, and the connection between the links 101 and the side plates 103 is by means of rivets. The ends of the rivets project internally to provide engaging members, the purpose of which will be later pointed out.

Riding in the links 101 of the said puller chain 73 is an endless belt of yielding material, such as soft rubber. The projecting internal ends of the rivets hereinabove referred to project into grooves arranged at each side of the elastic belt, the grooves being continuous and coextensive with the length of the belt and identical upon each side thereof. The rivets thus retain the rubber portion of the chain in the channel of the links 101 while the sprocket 65 is driving said chain positively through the engagement of the teeth of the sprocket with the lug teeth 102, one of which is upon the back of each link 101.

As hereinabove pointed out, the forward end of the puller frames 60 includes an idler sprocket wheel 66. The stalk puller chain 73 intermediate the idler 66 and the drive sprocket 65 is pressed outwardly of the frames 60 by a plurality of spring actuated idler rollers 67 shown in Figure 4, these idler rollers being rotatably journalled in pivoted arms 68. Pivoted arms 68 are urged outwardly by compression springs 72 mounted upon rods 70.

One end of each rod 70 is mounted for reciprocal movement adjacent to a free end of the pivoted arms 68 and the other end of said rod 70 is secured in the puller frames 60. The springs 72 exert a resilient force upon the idler rollers 67, thus providing sufficient tension to cause the chain 73, where the sections of the said chain 73 and of the opposed puller frames 60 are contiguous, to grip and to hold an exposed portion of a crop top, such grip being of a firm but not destructive character, while the crop is being elevated from the ground.

The tension of the compression rings 72 may be adjusted by take-up nuts 71. One take-up nut 71 is provided with each rod 70, so that it is a relatively simple matter to provide the various rollers 67 with different spring tensions, in order that the crop may be held progressively tighter, or more loosely, as it travels from the front end to the rear end of the puller frames 60 while held securely therebetween by the resilient or rubber belts 73. Normally the adjacent faces of the chains 73 are contiguous or substantially contiguous for the entire inside faces of the puller frames 60.

Over the under face of each puller frame 60 is a bottom plate 74 (see Figure 3) secured thereto by bolts 69 passing through spindles 75, on which spindles 75 the arms 68 are mounted. At its front end, the bottom plate 74 terminates in a shoe 76 serving to guide the puller frames over the ground at a predetermined height therefrom (see Figure 6).

Also, at its forward end, the puller frame 60 includes a tapered portion 64 which guides the exposed leaves of a crop upwardly over the top surface of the puller frames 60 and intermediate the rubber tired puller chain 73. Pointed rods 61 are reciprocally mounted in the forward end of the puller frames 60. Said rods 61 project forwardly beyond the puller frames 60, and are positioned at an angle to move in close proximity to the adjacent ground, whereby to raise from the ground any part of the exposed portion of the crop, such as the leaves, which may be recumbent upon the ground.

In order that the rods 61 shall be resiliently mounted, compression springs 62 are disposed between the rods 61 and the puller frames 60 to exert an urging force upon the rods 61 to force them outwardly of the puller frames 60. Should the rods 61 encounter an obstruction, said rods, or either of them, are forced into the puller frames 60, thus permitting the rounded nose of the puller frames 60 to slidingly pass over the obstruction.

By employing a pair of oppositely disposed similar puller frames 60 urged together by the spiral spring 83 (see Figure 5), the puller frames 60 may be made to separate slightly or widely, as necessity demands. Levers 79 are mounted upon each of the arch brackets 77 and 81 by means of bolts 93 and are joined together by a tubular member 80 (see Figure 6).

Figure 5:
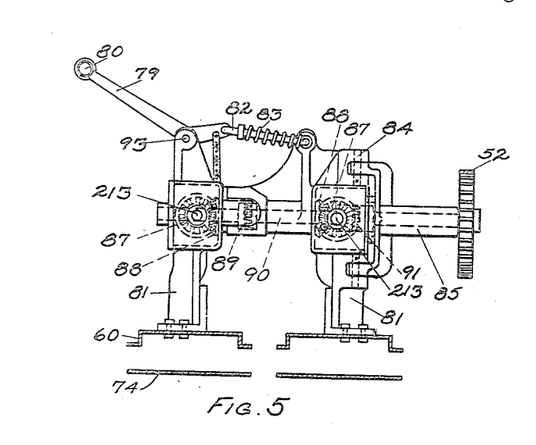
Figure 5 is a rear view of an arch support for the puller members showing a spreader device therefor.

Referring particularly to Figure 5, it will be noted that one end of a rod 82, around which said coil spring 83 is disposed, is mounted in one arm of said lever 79. The other end of said spring rod 82 is mounted reciprocally in arch bracket 81.

In the event a stone or other incompressible foreign object is wedged between the stalk puller frames 60, i. e., between chains 73, the tension upon springs 83 may be relieved. This is accomplished by raising the tubular member 80. Such movement lowers the horizontal plane of the spring rods 82, by the movement of levers 79, and such movement also draws apart the puller frames 60. In order that the puller frames may move relatively to one another, a flexible joint 89 is mounted on shaft 90 at the points where the arch brackets 77 and 81 are hinged.

From reference to Figure 2, it will be noted that the puller frames 60 are supported at their front end by a bevel crank 107, the latter being secured to an extended pivot pin 78 by a connecting rod 106 (Figure 2). Connecting rod 106 and bevel crank 107 are held together by a pin 115. Connecting rod 106 is secured to said pivot pin 78 by a ball and sprocket joint.

Bevel crank 107 is secured within a clevis 119 by a pin 118, the latter being of such construction that it will allow of transverse movement of the puller frames 60 when they are being guided along a row of crop.

Said clevis 119 is secured to a shaft 107 which is rotatably mounted in brackets 120 and 121, said brackets being secured to the transverse frame member 13. An arm 110 is secured to a hand lever 112 and is mounted on shaft 108 so that said shaft 108 is free to turn in said arm 110. An arm 109 is secured to shaft 108. Spring rod 113 is mounted in the arm 110. Said spring 113 is so mounted in arm 110 that it passes through arm 109. A spring 114 is mounted upon rod 113, and exerts a resilient tension upon arm 110 to urge the puller frames 60 into an adjusted position, but permitting of said puller frames 60 to slide over obstructions and uneven ground, the springs 114 compensating for the changes in the position of said puller frames. By hand lever 112 the height of the stalk puller frame 60 may be adjusted by the operator from his seat 14.

In order that the puller frames may register with a row of crop, means for shifting said puller frames 60 transversely of the machine frame to guide them are provided. This is done by foot levers 123 and 124 pivoted to a bracket 193 by a pin 126. Foot rests 122 are mounted on the foot levers 123 and 124 by studs 125, secured in said foot levers 123 and 124. Foot lever 123 is joined to a bevel crank lever 107 by a rod 117. By using two foot levers, the foot rests 122 are at all times in transverse position with respect to the machine.

A lifter 127 is mounted under the puller frames 60 to assist in the elevating of the crop. By the arrangement herein illustrated, i. e., positioning the lifter 127 in juxtaposition and beneath the lifter frames 60, as shown, the crops are actually elevated by the breaking of the ground therebeneath by the lifter 127, the puller chains 73 making the elevation obtained by the breaking of the ground a truly vertical elevation, and permitting of the additional elevation obtained through the chains 73, a relatively simple matter without burdening chains 73 with a pull upon the crops to dislodge them from the ground.

Said lifter 127 is adapted to run to the ground beneath the body portion of a root crop, and is pivoted upon a stud, 200, set in an arched member 199. The arched member 199 is mounted on the left hand side on a stud 198, which latter is secured in the main frame 1. The right hand side of the arch shaped member 199 is mounted on a stud secured in a bracket 210.

A safety catch 196 is disposed upon frame members 194 and is pressed against the arch shaped member 199 by a spring 201. In case the lifter 127 strikes an obstruction, the catch 196 will permit of the arched member 199 pivoting on its supporting stud, thus allowing the lifter 127 to rise out of the ground. Such a construction prevents such damage as would result from the machine becoming lodged against movement in accordance with the demands of the traction applied thereto.

The plow or lifter 127 may be controlled from the operator's seat 14. A hand lever 135 is disposed on a pin 202 set in a bracket mounted on a longitudinal frame member 195. A spring rod 209 is secured at one end in said hand lever 135, and at its other end it is reciprocally mounted in an arm 206. The latter arm 206 is mounted upon a shaft 204 which is journalled in bracket 205.

Arms 203, which are secured to shaft 204, terminate with steps which slide within slots 207 in the lifter beam of lifter 127. A spring 208 mounted on the spring rod 209 forces the lifter 127 into the ground as the hand lever 138 is lowered.

*The cutting mechanism*

The mechanism employed to remove the tops with the appendages from the body of a crop comprises primarily two oppositely disposed paired chains, having the ends of one pair beneath the ends of the next adjacent pair (see Figures 10 to 15 inclusive) and disposed in the path of a crop elevated and being conveyed by the lifting chains 73. The chains just referred to operate in such a manner that the appendages of the crop are drawn between the two oppositely disposed continuous chain sections, the crops being gripped more closely to the tops thereof within certain limitations by the action of such chains (see Figures 10 and 14).

Stated differently, the cutting mechanism comprises two oppositely disposed sets of gauging chains disposed in the path of a crop through the machine. The gauging chains operate in such manner that the appendages of the crop are drawn between the two oppositely disposed gauging chain sections.

The gauging chains act as a crop positioning, and elevating and conveying means. The chains are linearly arranged and paired, one chain in each pair being moved in a direction opposite to its complemental member of such pair to define a narrow path therebetween. Such chains are in succeeding series, the series being in staggered relation. One series of chain preferably overlaps in part the adjacent series. By arranging a part of the flight of one series of chains above a part of the flight of the contiguous series of chains and arranging the several series obliquely to the surface of the ground, the root crop is elevated, each succeeding series of chains gripping the crop upon a lower part of its foliage until the root crop itself arrests lower gripping thereof by the contact of the under face of the conveying chain with the top surface of the root crop.

There are two sections of gauging chains 150 which are oppositely and complementally disposed. The chains rotate in opposite direction, it being the purpose of said chains 150 to engage the appendages of a crop, to serve as a moving gauge which positions and holds the top face of all of the root crop in a fixed plane as said crop is being conveyed rearwardly by the lifting chains 73. Because of the angle between the puller frame 60 and the gauging chains 150, the lifting chains 73 will exert a pulling effect upon the appendages of the crop. All of the root crop will be drawn upwardly while it is being engaged by the gauging chains 150 so that, as the crop travels toward the rear of the machine, under the influence of the chains 73, the root portion of the crop will be held with its top face in a fixed plane, i. e., the under surface of the chains 150.

The pulling effect of the chains 73 is adjusted to the point that it is insufficient to break the appendages from the root portion of the crop.

Figures 11, 12, 13, 14:
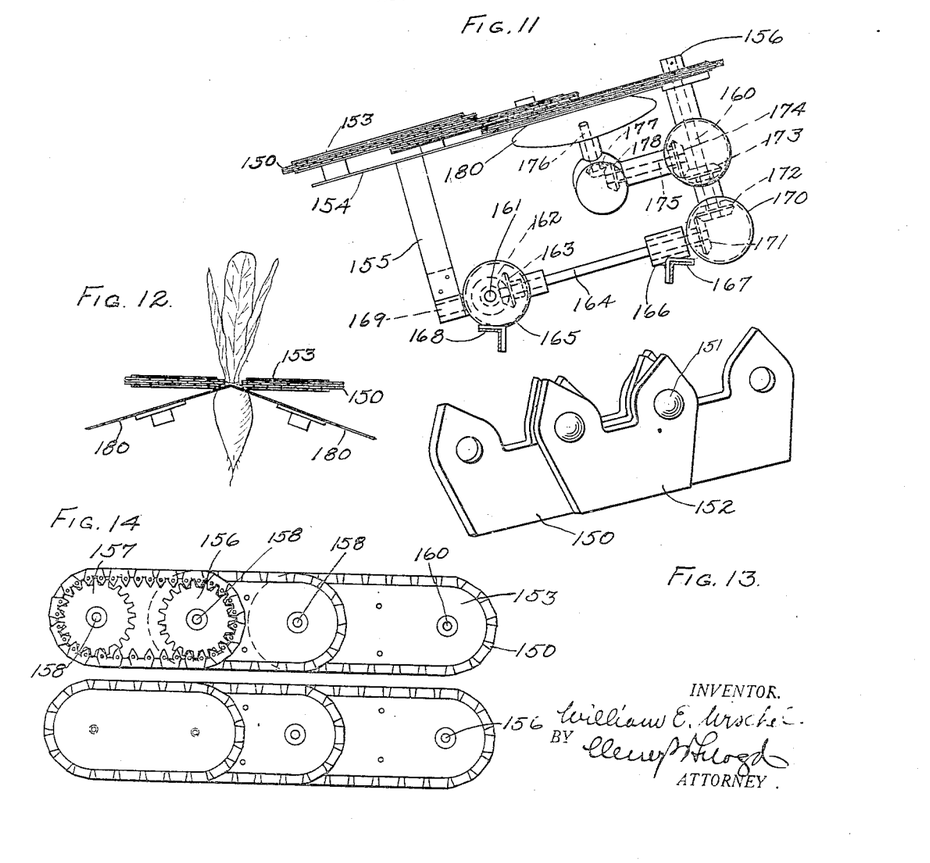
Figure 11 is a fragmentary detail of the guide or gauging chains and severing means.
Figure 12 is a cross section of the rear guide or gauging chains.
Figure 13 is an enlarged detail of a section of a guide or gauging chains.
Figure 14 is a diagrammatic plan view of the guide or gauging chains.

Each set of gauging chains generally comprises a plurality of paired chains 150, three sections being illustrated, positioned in such a manner that the idler sprocket of one chain is directly under the driving sprocket of the preceding chain, as is shown in Figure 11. In operation, each succeeding pair of chains grasps the appendage of the crop at a lower point than the next preceding pair of chains, thus gathering in loose appendages and insuring that the top face of the root crop is drawn firmly against the gauging chains 150. Such positioning is facilitated by the lift of chains 73 exerted upon the crop. While so held, the cutting mechanism hereinafter described will operate upon the root in a plane beneath the fixed plane for the top surface of the root.

The gauging chain (see Figure 13) comprises a middle link 143 and two outer links 152 secured together by rivets 151. Each of said links is provided with teeth adapted to engage the teeth of sprockets 156 and 157.

The gauging chains are driven by a drive sprocket 156 secured to shaft 160. The idler sprockets 157 of each chain are securely fastened to the drive sprockets 156 of the preceding chain. Both of said sprockets revolve on studs 158 secured in a bar 154. Each of chains 150 is covered by a top plate 153 to prevent dirt or foreign matter from falling into the chain.

By referring to Figures 11 and 14, it will be noted that each section of the gauging chains is supported at the rear end by a bearing bracket 170, and at the forward end by bars 155. Bars 155 are pivoted at the lower end on studs 169 which are secured in gear housings 175, said housings being secured to transverse frame members 168. The bearing brackets 170 are pivoted at their lower ends in brackets 166 which are fastened to transverse frame member 167. Transverse frame members 167 and 168 are secured to main frame members 1. The two sections of gauging chains are resiliently pressed together by springs 221 on spring rods 222. Such construction allows the gauging chain sections to spring apart as the appendages of the crop vary in thickness and in volume.

The gauging chains are driven from a counter shaft 161 which is journaled in bearing 189 and gear housings 165. Counter shaft 161 is driven by chain 39 through sprocket 179. Chain 39 is driven by sprocket 53 which is secured to shaft 57. Bevel gears 162 which are secured to shaft 161 drive bevel gears 163 which are fixed to shafts 164. Said shafts 164 are journaled in gear housings 165 and hubs of bearing brackets 170 which project into the brackets 166. Bevel gears 171 fixed to shafts 164 drive bevel gears 172 which are secured to shafts 160. Shafts 160, to which drive sprockets 156 are secured, are journaled in bearing bracket 170.

The exposed or upper portion of a crop is sheared or otherwise severed in the present machine by a pair of oppositely disposed circular cutters 180 (see Figures 11 and 12) mounted directly in the path of the crop. The path referred to is the path which the crop assumes when being held between the two gauging chain sections and as it approaches the end of the gauging chain sections. The crop is at all times under the elevating influence of the puller mechanism 60.

Cutters 180 are fixed to shafts 176 which impart opposed rotation to the cutters 180. Said shafts 176 are provided with suitable bearings in bearing brackets 170. Bevel gears 177 fixed to shafts 176 are rotated by bevel gears 178 which are secured to shafts 175. Said shafts, which are journaled in bearing bracket 170 are driven by bevel gears 174, which in turn are driven by bevel gears 173. Bevel gears 173 are securely fixed to shafts 160, the drive of which has hereinbefore been described.

When desirable a conveyor 184 of conventional design may be provided to receive the crop as shown in Figures 1 and 2. Such conveyor is supported at the front end by bars 188 secured to transverse frame members 168. The rear end of the conveyor is supported on a transverse rod 185 passing through said conveyor and secured in brackets 186. Brackets 186 are fastened to the main frame members 1. Sprocket 183 secured to conveyor drive shaft 187 is driven by chain 182. Said chain is driven by sprocket 223 (see Figure 15) which is secured to counter-shaft 161.

General remarks

With the arrangement of the parts hereinabove described, it will at once be apparent that a machine has been provided in which the pulling instrumentalities 73 are adapted to grasp the exposed appendages of the soil embodied crops to gradually elevate them along a predetermined path to effect the removal thereof from the soil and to sever the appendages therefrom. The soil elevator 127 assists the chains 73 in taking the crop from the soil.

The mouth of the pulling means, in this instance defined by the cooperating puller units 60, is guided in a line coinciding with the linear path along which crops usually are planted so that the contacting faces of the flexible puller chain 73 will yieldably grasp the exposed portions of the crop and carry and elevate them along an arcuate path having a gradual incline to slowly pull the crop from the soil, this being aided and abetted by the soil lifting efforts of the elevator plow 127.

Figure 10:
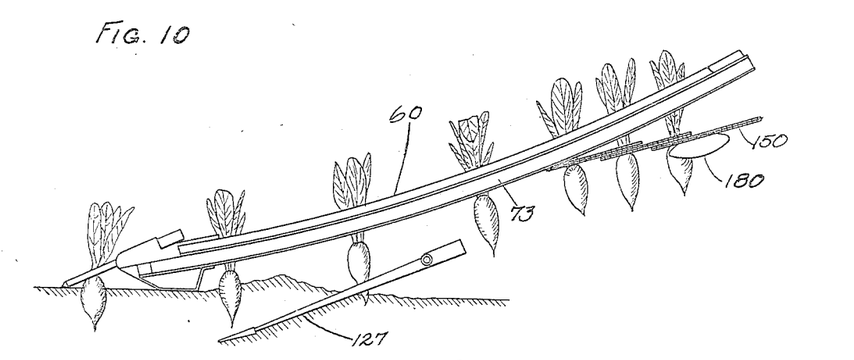
Figure 10 is a diagrammatic side elevation illustrative of the operations of the machine, showing the relative positions of the crop puller, the plow, and the guide chains.

The crop is first engaged by the pulling members on line A—A (see Figure 10). As the crop is carried rearwardly, the lifter 127 which cooperates with pullers 73, loosens the ground about the crop and pushes or lifts the crop from the ground.

The crops freed from the soil are carried to the topping instrumentalities. The appendages of the crop are conveyed between the gauging chains and as the crop is conveyed rearwardly, the top faces of the crop are pulled up against said gauging chains. As the gauging chains travel rearwardly at the same speed as the crop is conveyed by the lifting chains 73, the crop moves without impedance.

As the crop is carried rearwardly by the lifter chain and the gauging chains, it is carried through the abutting edges of the oppositely disposed cutters 180 positioned as shown in Figures 11 and 12. Said cutters sever the appendages and the crown or top part of the crop from the body of the crop. The cutters 180 may be adjusted to cut away the desired portion from the body of the crop.

When severed from the appendages, the body of the crop falls into the conveyor 184, from which it is discharged on the ground or into a suitable container (not shown). When desirable the crop may be elevated into a wagon moving alongside the machine. The appendages of the crop are discharged from the machine at the rear end of the puller frames 60.

Reference is directed to a co-pending application for Letters Patent filed by the applicant, Serially Numbered 411,722, filed December 5, 1929, and entitled "Beet harvester," which application is now patent 1,894,802 issued January 17, 1933.

I claim:—

1. A conveyor holding root crops by their leaves, a cutter in the path of said conveyor, and crop positioning means comprising paired chains in succession and in parallel planes intermediate said conveyor and said cutter.

2. A unit comprising a conveyor, a cutter in the path of objects in said conveyor, and object positioning means comprising paired chains in staggered relation operative upon objects in said conveyor as they approach said cutter.

3. The combination of a conveyor carrying root crops by their leaves, a cutter for severing the leaves from the root portions, and a series of linearly arranged and partly overlapping paired chains operative in adjacent parallel planes to engage the leaves for adjusting the positions of said roots relatively to said cutters.

4. The combination of a conveyor for root crops engaging such crops by their leaves, of a cutter acting to sever the root and leaves, and crop adjusting means comprising paired chains in staggered relation operating upon the portion of the leaves beneath that part held by said conveyor to guide the crop past said cutter.

5. Elevating means for soil embodied crops having leaf appendages, comprising a plurality of paired chains transversely engaging said appendages and adapted to draw said appendages away from the root portion said chains being arranged one after another and in adjacent parallel planes.

6. Root crop elevating means comprising paired complemental chains arranged staggeredly, and means for concurrently actuating each series of chains.

7. The apparatus described in claim 6, and in which adjacent pairs of chains are arranged one beneath another.

8. Elevating means for a root crop comprising a series of paired chains moving in the same direction and disposed in close proximity, one pair of chains overlapping a section of the next succeeding pair of chains, the chains engaging the foliage of a root crop to draw such foliage therebetween while maintaining the root crop upon the opposite side of the chains.

9. Means for adjusting the top surface of root crops to an instrumentality adapted to operate thereon, comprising a series of endless paired chains, a part of the flight of one pair of chains being superimposed over a part of the flight of the next series of chains, and means for rotating said chains to cause said each series to define a narrow path therebetween, said chains being adapted to draw the foliage of a root crop therebetween while maintaining the root portion of the crop in a predetermined position relative to the opposite side of said chain.

10. A harvesting machine comprising conveyors adapted to engage the foliage of a crop and move said crop upwardly in an arcuate path, knife members disposed in the path of said conveyors, and gauging means comprising paired chains intermediate said conveyors and knives and guiding the root crop past said knives.

11. In a harvester, pairs of linearly arranged endless chains having flights in parallel planes offset from one another and adapted to grasp the foliage of a root crop and movable to draw the root toward one surface of said chains and longitudinally thereof.

WILLIAM E. URSCHEL.